United States Patent
Fehrenbacher et al.

(10) Patent No.: US 11,318,542 B2
(45) Date of Patent: May 3, 2022

(54) TOOL-CHANGING DEVICE, MACHINE TOOL HAVING SUCH A TOOL-CHANGING DEVICE, AND ASSOCIATED METHOD

(71) Applicant: J.G. Weisser Sohne GmbH & Co. KG, St. Georgen (DE)

(72) Inventors: Florian Fehrenbacher, Lauterbach-Sulzbach (DE); Thorsten Rettich, Konigsfeld (DE); Reiner Jorg, Schramberg (DE)

(73) Assignee: J.G. Weisser Söhne GmbH & Co. KG, St. Georgen (DE)

( * ) Notice: Subject to any disclaimer, the term of this patent is extended or adjusted under 35 U.S.C. 154(b) by 5 days.

(21) Appl. No.: 16/629,767

(22) PCT Filed: Jul. 12, 2018

(86) PCT No.: PCT/EP2018/068991
§ 371 (c)(1),
(2) Date: Jan. 9, 2020

(87) PCT Pub. No.: WO2019/012059
PCT Pub. Date: Jan. 17, 2019

(65) Prior Publication Data
US 2020/0180090 A1 Jun. 11, 2020

(30) Foreign Application Priority Data
Jul. 14, 2017 (DE) .......................... 102017115951.7

(51) Int. Cl.
*B23B 29/32* (2006.01)
*B23Q 3/155* (2006.01)
(Continued)

(52) U.S. Cl.
CPC .............. *B23B 29/326* (2013.01); *B23B 1/00* (2013.01); *B23B 3/16* (2013.01); *B23Q 3/157* (2013.01);
(Continued)

(58) Field of Classification Search
CPC ..... B23B 1/00; B23B 2240/00; B23B 29/326; B23B 3/16; B23Q 3/155; B23Q 3/15553; B23Q 3/157; B23Q 5/20
See application file for complete search history.

(56) References Cited

U.S. PATENT DOCUMENTS

| 1,406,339 | A | 2/1922 | Brawand |
| 3,162,064 | A | 12/1964 | Musy |

(Continued)

FOREIGN PATENT DOCUMENTS

| CN | 201455325 | 5/2010 |
| CN | 207154803 | 3/2018 |

(Continued)

*Primary Examiner* — Nicole N Ramos
(74) *Attorney, Agent, or Firm* — Volpe Koenig (57) ABSTRACT

A tool-changing device which is used on machine tools (18). Here, provision is made to carry out positioning of a tool holder (2) in the working position (6) of the tool holder with the aid of the locking element (7) of the drive device (4) of the tool-changing device (1). An adjusting movement (22) of the locking element (7) into the locking position (9) of the locking element on the tool holder (2) that is required for the use of the tool (3) is used to position the tool holder (2) in the working position (6) thereof, by the adjusting movement (2) of the locking element (7) being converted into a positioning movement (21) of the tool holders (2).

20 Claims, 7 Drawing Sheets

(51) Int. Cl.
  *B23Q 3/157* (2006.01)
  *B23Q 5/20* (2006.01)
  *B23B 1/00* (2006.01)
  *B23B 3/16* (2006.01)

(52) U.S. Cl.
  CPC ........... *B23Q 3/15553* (2013.01); *B23Q 5/20* (2013.01); *B23B 2240/00* (2013.01)

(56) References Cited

U.S. PATENT DOCUMENTS

| | | | |
|---|---|---|---|
| 3,371,566 A | | 3/1968 | Gramespacher |
| 3,740,161 A | * | 6/1973 | Milewski .......... B23B 29/03457 408/158 |
| 3,853,422 A | * | 12/1974 | Benjamin ......... B23B 29/03417 408/161 |
| 4,508,475 A | * | 4/1985 | Peuterbaugh ..... B23B 29/03446 408/153 |
| 4,979,852 A | * | 12/1990 | Noggle ............. B23B 29/03457 408/156 |
| 5,120,167 A | * | 6/1992 | Simpson ........... B23B 29/03446 408/153 |
| 5,427,480 A | * | 6/1995 | Stephens .......... B23B 29/03457 408/156 |
| 6,312,200 B1 | * | 11/2001 | Graham ........... B23B 29/03446 408/1 R |
| 6,394,710 B1 | * | 5/2002 | Kurz ................ B23B 29/03457 408/1 R |
| 7,260,877 B2 | * | 8/2007 | Broadley ............ B23B 29/0345 29/27 R |

FOREIGN PATENT DOCUMENTS

| | | |
|---|---|---|
| DE | 1402926 | 11/1968 |
| GB | 101696 | 10/1916 |
| GB | 173967 | 1/1922 |
| SU | 651899 | 3/1979 |

* cited by examiner

TOOL-CHANGING DEVICE, MACHINE TOOL HAVING SUCH A TOOL-CHANGING DEVICE, AND ASSOCIATED METHOD

TECHNICAL FIELD

The invention concerns a tool-changing device with at least two tool holders designed to hold one tool each and with a drive device through which the tool holders can be moved relative to a frame of a machine tool and/or one of the tool-changing devices into a working position.

The invention also concerns a machine tool with such a tool-changing device and a method for changing tools on a machine tool using a tool-changing device.

BACKGROUND

Such tool-changing devices, machine tools, as well as methods for changing tools have already been recorded through a number of state-of-the-art designs. Particularly in the case of high-precision machinery, options to lock tools in place play an especially important role. These state-of-the-art tool-changing devices are motorised drive devices, through which tool holders can be adjusted into the desired positions. Once the tool holder has reached the desired position, it is then locked into that position through the use of a locking element, which is operated using another drive element, so that the machine can be used to process the workpiece. In this way, both a drive device and a locking device, each of which are equipped with their own drive elements, must be available for simultaneous use, a feature which requires a comparatively large amount of effort.

In line with the above, this invention is tasked with providing a tool-changing device, a machine tool, and a method of the type described, which use a reduced level of effort when positioning the tool holders into a working position and locking them into the working position.

This task has been met through the development of a tool-changing device of the type described above, which has the capabilities and characteristics required of such a tool-changing device and can be manufactured as an independent piece of machinery. In particular, in order to meet the requirements for a tool-changing device of the type described above, it is proposed that the drive device comprises at least one locking element and at least one counter element, connected at least indirectly to the tool holders (a minimum of two), where the movement of the tool holders into a working position and the locking of the tool holders into the same position results in a relative adjusting movement in the locking element and counter element. The tool holders are locked in this locking position when the locking element and the counter element engage in a locked position.

At its core, this invention turns on the idea of designing a tool-changing device in such a way that an adjusting movement required for locking the tool holders carried out by the engagement of a locking element and/or a counter element with one another is used to position the tool holders into a working position. In other words, the tool-changing device is designed to position the tool holder into the working position by locking them together.

This means that in the case of this newly invented tool-changing device, a separate drive element for positioning the tool holders into their working position is no longer required. This presents an advantage as on the one hand less construction space is required and, on the other hand, less energy is required for adjusting and locking the tool holders.

The locking element and the counter element can engage mechanically, preferably in such a way that through an adjusting movement by the locking element relative to the counter element, its locking position can be converted into a positioning movement by the counter element. This positioning movement allows the tool holders to reach the working position and to be fixed in place by the locking element, which reaches its final locking position on the counter element. The counter element can be used as a transmission element to transmit the driving force of the locking element to the counter element in order to position the tool holders into the working position.

However, it is also possible that the locking element and the counter element engage, preferably mechanically, in such a way that through an adjusting movement by the counter element relative to the locking element, its locking position on the locking element can be converted into a positioning movement by the counter element, through which the tool holders can reach a working position.

It is preferable for the locking element and the counter element to interact mechanically in such a way that line adjustment of the locking element or the counter element causes a rotary positioning movement by the counter element. The linear adjustment of the locking element is achieved by an adjusting movement by the locking element into the locking position relative to the counter element. The linear adjustment of the counter element is achieved by moving the counter element into the locking position relative to the locking element. The rotary positioning movement of the counter element can occur in a position that corresponds to the working position. This method allows for the tool-changing device to be used, for example, with tool turrets on machine tools. In this context, it can be beneficial if the counter element is mounted onto the base body of the tool-changing device such that it can rotate.

The positioning movement created by the locking element onto the tool holders (at least two) and/or a tool head on which the tool holders (at least two) can be attached, can be either a linear movement or a rotary movement. A rotary positioning movement can be achieved around a rotation axis on the tool head. The tool holders can rotate along a closed path around the axis of rotation.

It is preferable for an adjusting movement achieved through the locking element to be a linear movement, although it may also be a rotary movement.

Converting the adjusting movement by the locking element into a positioning movement for the tool holders is relatively simple to achieve if the counter element (at least one) has a tooth or claw profile that corresponds to the locking element (again, at least one). The tooth or claw profile can be designed so as to correspond with the locking element, enabling the tooth or claw profile of the locking element to engage with the tooth or claw profile of the counter element, and subsequently for the elements to rotate.

Converting the adjusting movement by the locking element into a rotary movement by the counter element can be achieved with very little loss of energy, provided that the counter element remains stationary in the axial direction, i.e. it is not displaced along its axis by the connection of the locking element, but is merely rotated. This allows for the locking element and counter element to form a kind of gear stage that enables an initial movement—the adjusting movement—to be converted into a second movement, i.e. the positioning movement. Additionally, the counter element is locked through the use of this gear stage when at least one of the tool holders has reached its working position and, subsequently, the locking element has reached its locking position.

It is especially preferable for the locking element and counter element to have tooth or claw profiles which correspond to one another. The tooth or claw projections on the tooth or claw profiles should preferably be evenly distributed around the counter element's axis of rotation.

The tool holders can be connected to the counter element in such a way that movement between the tool holders and counter element can be prevented and avoided altogether. In other words, the tool holders and the counter element can be connected in a way that is rotationally fixed. This allows for any movement by the counter element that is caused by the locking element to be transferred to the tool holders in a secure way.

The tool-changing device can be fitted with a tool head. Tool heads (at least two) can be attached or built onto this tool head. It is also possible for the tool head to move in rotary motion relative to the frame and/or the body of the tool-changing device.

In terms of the design of the tool-changing device, it is possible to ensure that the locking element is designed as part of the frame or the base body, and that the counter element is designed on a movable tool head, such as that described above. It is also possible for the locking element to be designed on a movable tool head, such as that mentioned above, with the counter element attached to the frame.

One particularly preferable design for the tool-changing device would allow for the locking element to be designed as an axially fixed claw element—either fixed rotationally or non-rotatable relative to the base body of the tool-changing device—and the counter element to be designed as a rotatable counter claw element that is axially displaceable relative to its axis of rotation. Both the locking element and the counter element would then each have at least one claw edge at an angle to the axis of rotation of the counter element. The claw edges of the two claw elements would then be designed to correspond to one another and could have engaging surfaces at an angle to the axis of rotation of the counter element, so that—by adjusting the counter element to its locking position on the locking element—a driving force can be transferred through the claw edges and their engaging surfaces to the counter element.

Together, the locking element designed as a claw element and the counter element designed as a counter claw element form a kind of claw coupling in the locking position.

It can also be advantageous if the tool-changing device features a positioning device. With such a positioning device, a positioning force can be transmitted, at least indirectly, to the tool holders (preferably via the counter element). The positioning force can also be transferred to a tool head—in particular to one of the types described above—onto which the tool holders can be attached.

The positioning device can be fitted to automatically move the tool holders from the working position to an intermediate or resting position through the use of the positioning force. Through the same positioning force, the counter element can be moved to the engaging position from a position that corresponds to the working position. Such a design is especially beneficial where the positioning device acts directly on the counter element. In this engaging position, the counter element can be designed so that the locking element can engage with the counter element a second time or vice versa, allowing for another of the tool holders (at least two) to move into a working position through the use of the locking element. This method allows for a tool-changing device to be created in which the positioning device automatically moves the counter elements into an engaging position as soon as the counter element is lifted from its locking positioning by the locking element and the counter element is released or unlocked.

Through the use of the locking element, the counter element can therefore move automatically from a state in which none of the tool holders is in a working position and in which it is possible to engage and operate the counter element, to a state in which at least one of the tool holders is in a working position.

The level of positioning force depends on the relative positions of the locking element and the counter element to one another. With the locking element in the locking position, the positioning force can be enacted in the direction of a positioning movement for the tool holders, for example, using the method described above. It can particularly beneficial if the positioning force reaches its highest level when the locking element is in the locking position and at least one of the tool holders is in the working position. This in turn ensures that the counter element—together with the tool holder—can be moved further using sufficient positioning force generated by the positioning force enacted in the direction of the positioning movement as soon as the locking element has been released from the counter element.

Additionally, through the successive relative positions of the parts, the positioning force can optionally be enacted and aligned either in the direction of a positioning movement by the tool holders or against this direction, particularly relative to the counter element. This means that the positioning device can be used to position or reposition the counter element and tool holders automatically into a specified intermediate or engaging position relative to the locking element. Due to the positioning force vectors acting against one another in meeting two success relative positions, the positioning device can impact the centring of the tool holders into an intermediate position and/or the centring of the counter element into an engaging position in which the locking element once more engages with the counter element in an additional step in the positioning process. It is particularly preferable for the effectiveness of the positioning force if it achieves a minimum level when the counter element is in the engaging position. To ensure that the counter element is securely held in the engaging position, it may also be beneficial if the positioning device is designed to generate a holding force—preferably radial in nature—that is enacted on the counter element. This holding force should be able to reach its maximum level when the counter element is in an engaging position.

The positioning device can be constructed or designed between the frame or base body of the tool-changing device and the counter element, and feature at least two tool holders. More specifically, the positioning device can be designed as a magnetic positioning device. With the use of a magnetic positioning device that features permanent magnets, a separate power source would not be required for the positioning device. If the positioning device is designed as a magnetic positioning device, it should comprise at least one magnet fixed relative to the counter element and at least one counter magnet fixed to the counter element in order to generate sufficient positioning force. The counter element can be brought into an engaging position using at least one magnet and at least one counter magnet, especially in cases where the locking element is not engaged with the counter element.

It is particularly preferable for this kind of tool-changing device if the magnetic positioning device has several—preferably four—individual magnets that are evenly distributed across the corresponding pole alignment on a retaining ring, in particular around the axis of rotation of the counter element. The counter element itself can be fitted with an equal number of counter magnets that are distributed so as to correspond with those on the pole alignment. Where the counter element is in the working position, the magnets and the counter magnets can, through mutual attraction, generate the positioning force and/or holding force required by the positioning device described above, and can move the counter element automatically into an engaging position, where it can re-engage with the locking element to reposition the tool holders.

It can be particularly beneficial for the number of magnets and the number of counter magnets to correspond to the number or an integer multiple of the number of individual tool holders on the tool-changing device. This would then allow, for example, the counter element to be moved to a separate engaging position for each tool holder through the use of the magnetic positioning device, without any of the tool holders reaching a working position.

The positioning device can also be designed as a spring-activated positioning device with a ball-latch mechanism.

To adjust the locking element, the drive device can be fitted with a drive. This drive can be electric, pneumatic, hydraulic or electromagnetic, based on preference.

It can be particularly beneficial if the drive device is used in a machine tool that features a tool feeder. This can allow for the drive device to perform a dual function and to generate the tool-changing movement.

The feature mentioned above can also be achieved for a machine tool that features a tool-changing device in line with claims relating to tool-changing devices.

In this context, it can be beneficial for the machine tool to have a drive device that is so designed as to power a tool feeder and generate the relative displacement movement between the locking element and the counter locking element. In this configuration, an additional drive to power the tool-changing process would therefore no longer be necessary. Here, it is preferable for the tool feeder to be synchronised with workpiece rotation to allow for it to process workpieces that are not circular, for example. It is also advantageous if the adjusting movement and the tool feeder are designed to be parallel to one another, for example, both following the same straight line.

To be able to switch between an adjusting mode and a feeder mode, the machine tool may be fitted with a locking device, particularly in the form of a locking tappet. Through the use of this locking device, the locking element on the tool-changing device can be attached during the tool-changing process relative to the frame of the machine tool and/or relative to the counter element.

To achieve this, one of the claims relating to the tool-changing device provides a method for changing tools using a tool-changing device, in which a tool receiver on the tool-changing device for holding the tool reaches a working position through a relative displacement movement between a locking element and a counter element on the tool-changing device. As such, the locking element required—particularly for high-precision machine tools—can take on a double function, not only locking the tool holders into place, but also positioning them into a working position.

To bring a tool holder into position, the locking element can be moved into a locking position that secures the counter element. However, it is also possible to move the counter element in order to position the tool holder in a locking position relative to the locking element. Here, the adjusting movement can be converted into a positioning movement by the counter element. As such, when the locking element and/or counter element reach the locking position, one of the tool holders can either be brought into its working position and/or already be in that position.

The tool holder can be moved from the working position into an intermediate position after the locking element and/or counter element have been released from the locking position. Additionally, the released—i.e. no longer locked—counter element can be moved from a position that corresponds to the working position, to an engaging position in which the counter element and the tool holder are once again engaged in a lock. Both of these options can be achieved automatically after the locking element and/or the counter element has/have been moved out of the locking position, based on preference. The automatic adjustment of the tool holder and/or the counter element can be achieved through the use of an adjusting device. Here, a positioning device may also be used, as described in greater detail in claims 9 through 12.

Where the tool holder is moved into its working position, the tool can then be used for machine processes, including, for example, turning, milling and/or grinding a workpiece. This can be synchronised with rotation of a workpiece, especially for the production of non-circular turned parts using one clamping operation.

BRIEF DESCRIPTION OF THE DRAWINGS

The following section provides detailed descriptions using one example of the invention given in the drawing. They are shown in an illustration that, in parts, follows a highly schematic representation:

FIG. 9A to 10B additional cross-section and side views of the tool-changing device shown in previous figures, where in FIG. 9B the locking element is shown in an intermediate position and the counter element is shown in a corresponding intermediate position as it moves one of the tool receivers to its locked working position, and where in FIGS. 10A and 10B, the counter element has reached a position that corresponds to the working position of one of the tool receivers and the locking element has reached its final locking position.

DETAILED DESCRIPTION

Together, the above figures show a tool-changing device that is referred to as element 1. The tool-changing device 1 is used with the machine tool 18, shown at least partially in FIG. 1, and FIGS. 11 through 16. The remaining FIGS. 2 through 10b illustrate different perspective views of the tool-changing device 1.

Figure 1:
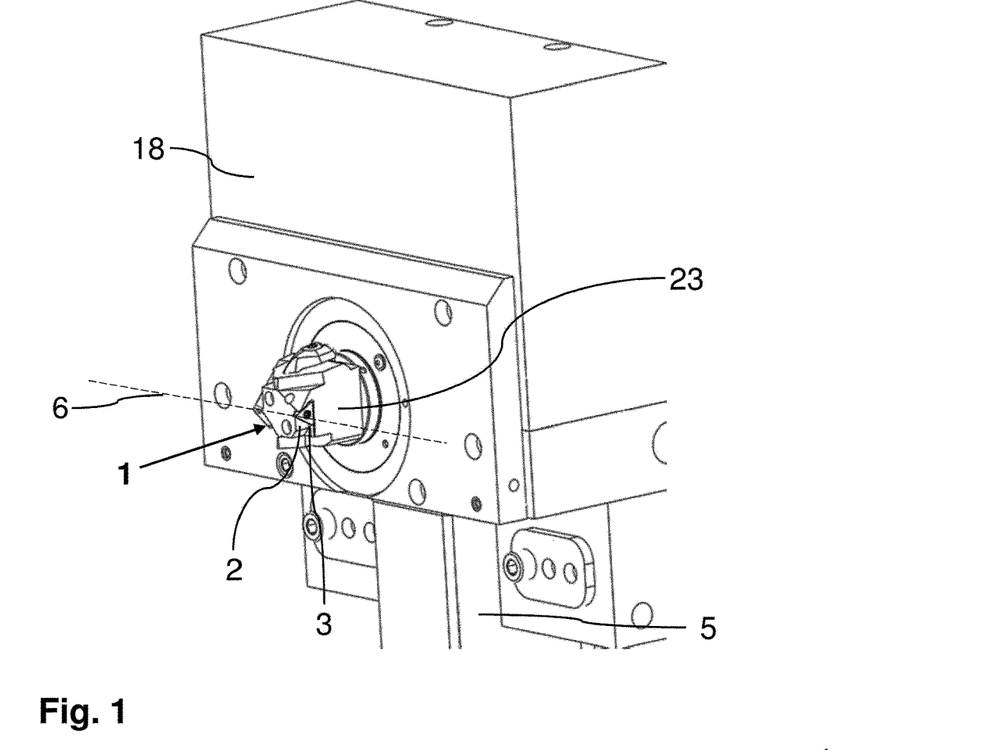
FIG. 1 a perspective view of a machine tool in line with the invention and featuring a tool-changing device with several tool holders.
Figure 2:
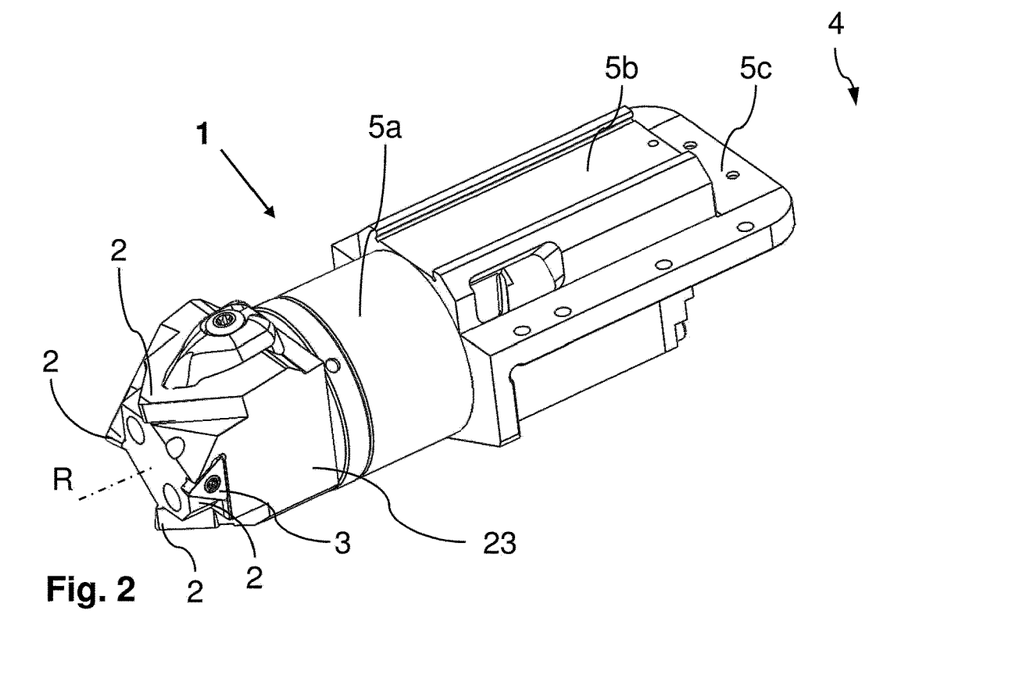
FIG. 2 a perspective view of the tool-changing device shown in FIG. 1.

The tool-changing device 1 is fitted with a tool head 23. A total of four tool holders 2 arranged at intervals of 90 degrees from other another are attached to the tool head 23. A tool 3 is attached to each tool holder 2. The tool-changing device 1 features a drive device 4, which moves the tool holders 2 relative to the frame 5 of the machine tool 18 and also relative to the base body 5a of the tool-changing device 1 into a working position. The working position is shown in FIG. 1 through the dotted line marked 6.

Figure 10A:
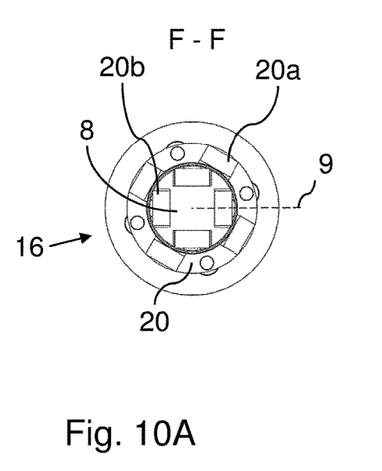

The drive device 4 comprises a locking element 7 and a counter element 8. The tool head 23 fitted with the tool holders 2 is connected to the counter element 8. The locking element 7 and the counter element 8 engage mechanically in such a way that the four tool holders 2 on the tool head 23 can be moved in turn into the working position 6 and engage there with the locking element 7. In the sample design given in the examples shown in the figures, the tool holders 2 are brought into position by moving the counter element 8 into its locking position relative to the locking element 7, e.g. as shown in FIG. 10A with the reference number 9.

Figure 9A:
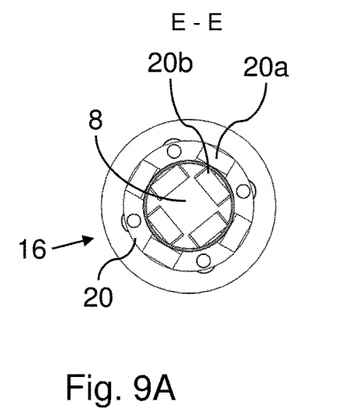
Figure 9B:
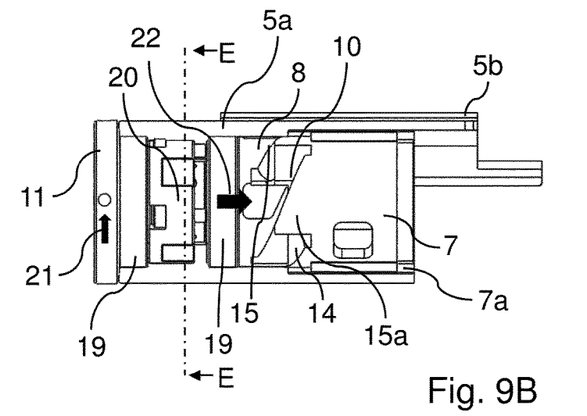
Figure 10B:
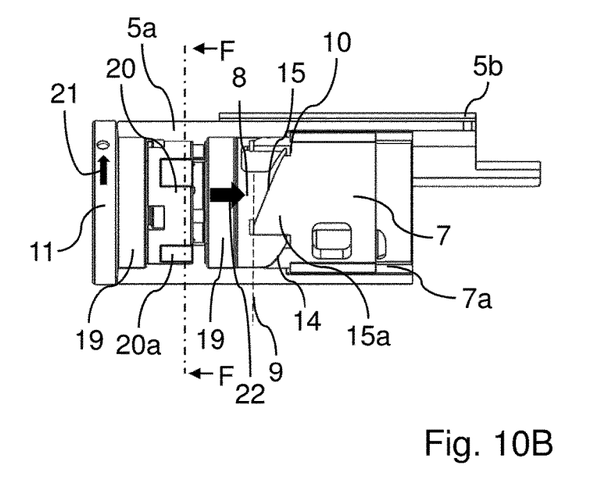

Over the course of the adjusting process, the locking element 7 engages mechanically with the counter element 8 in such a way that the linear adjusting movement by the counter element 8 into its locking position 9—as illustrated by arrow 22 in FIGS. 9B and 10B—results in a positioning movement by the counter element 8 in the direction shown through arrow 21 (FIGS. 9A and 9B).

Figure 6A:
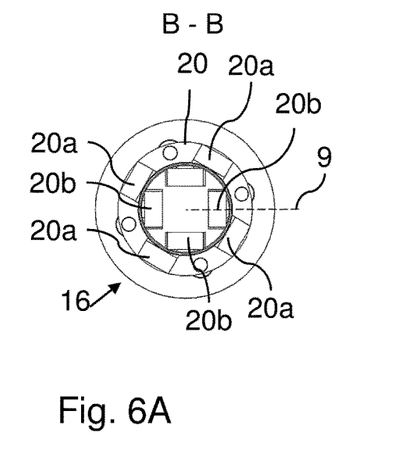
FIG. 6A a cross-section view of the tool-changing device along the line marked B-B in FIG. 6B with the locking element in the locking position.
Figure 6B:
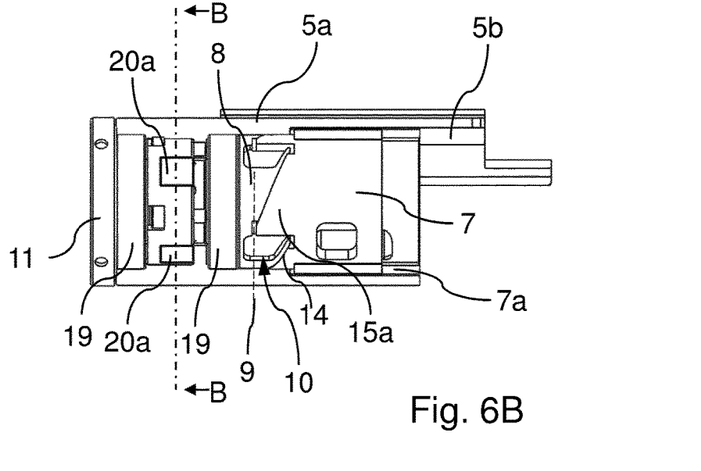
FIG. 6B a side view of the tool-changing device shown in the previous figures, that corresponds to FIG. 6A, with claw profiles engaged.
Figure 7A:
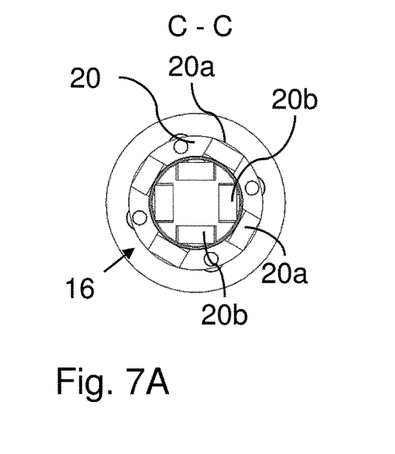
FIG. 7A a cross-section view of the tool-changing device along the line marked C-C in FIG. 7B.
Figure 7B:
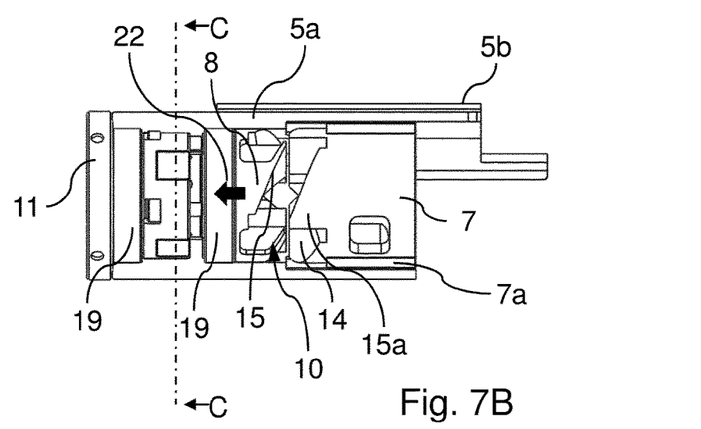
FIG. 7B a side view of the tool-changing device that corresponds to FIG. 7A, where the locking element is shown in its starting position, i.e. not engaged with the claw profile on the counter element.

As such, the counter element 8 is brought into either a relative position or a position that corresponds to the working position 6 of the tool holders 2. The corresponding position or relative position of the counter element 8 is shown in FIGS. 6A and 6B, as well as in FIGS. 10A and 10B.

The positioning movement 21, whose effect is transferred to the tool holders 2 on the tool head 23 through the use of the locking element 7 and the counter element 8 is a rotary movement which moves around an axis of rotation R set by the tool head 23 and the counter element 8. The adjusting movement 22 that is prompted by the counter element 8 is a linear movement that moves in the direction of the rotation axis R set by the tool head 23 and the counter element 8 relative to the locking element 7, which is itself in an axially fixed position.

The counter element 8 features a claw profile 10. The locking element 7 features a corresponding claw profile 10. When the counter element 8 engages with the claw profile 10 on the locking element 7, the counter element 8 can be rotated. Through the retaining ring 19, the locking element 7 stays in place in the axial direction on the base body 5a of the tool-changing device 1, i.e. it is axially fixed relative to the axis of rotation R. The locking element 7 is mounted on the base body 5a of the tool-changing device 1 relative to the axial direction. This effect is clear when one compares the two positions taken by the locking element 7, which are shown in FIGS. 2 to 10B and, especially, in FIGS. 11 to 16.

The tool holders 2 are connected to the counter element 8 through the tool head 23 in a way that prevents a relative movement by the tool holders 2 and the counter element 8. The tool holders 2 are connected to the counter element 8 through the tool head 23 so that they cannot rotate.

Figure 3:
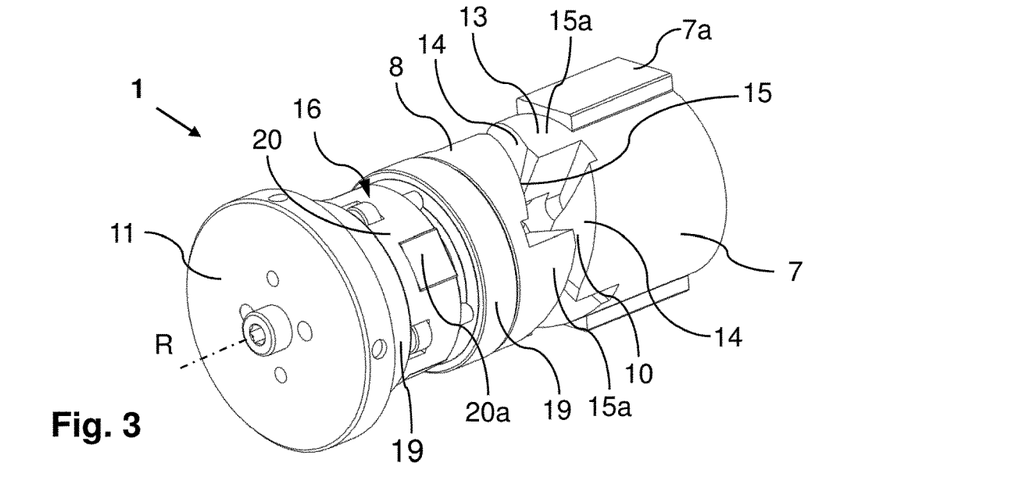
FIG. 3 a perspective view of the tool-changing device shown in FIGS. 1 and 2, in which a counter element on the tool-changing device can be seen that features a carrier plate for the tool head shown in FIGS. 1 and 2.
Figure 4:
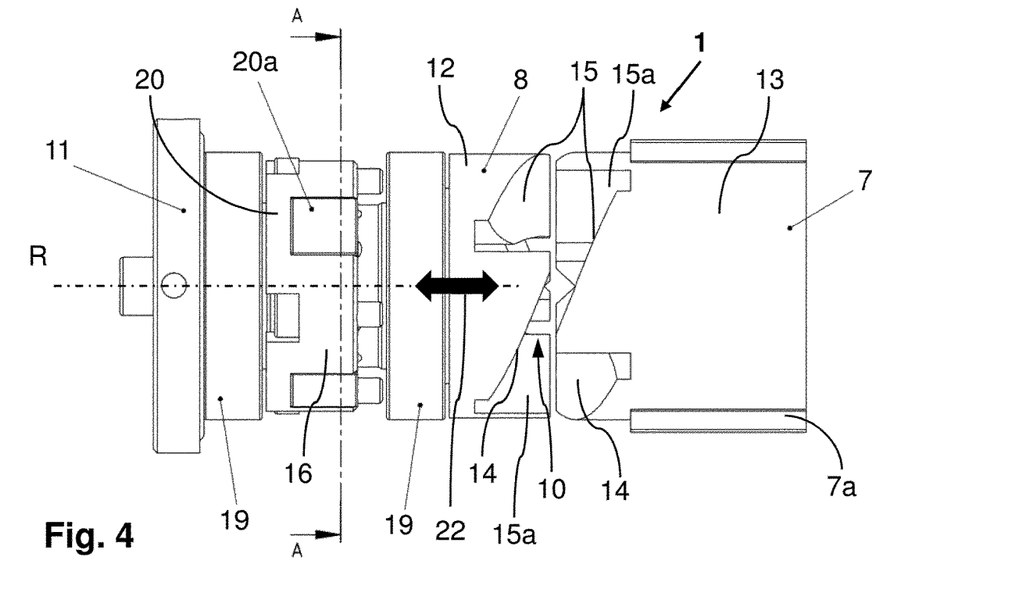
FIG. 4 a side view of the tool-changing device shown in FIGS. 1 to 3, in which a counter element featuring a (counter) claw profile and locking element can be seen engaging with a claw profile that corresponds with the claw profile on the counter element.
Figure 5:
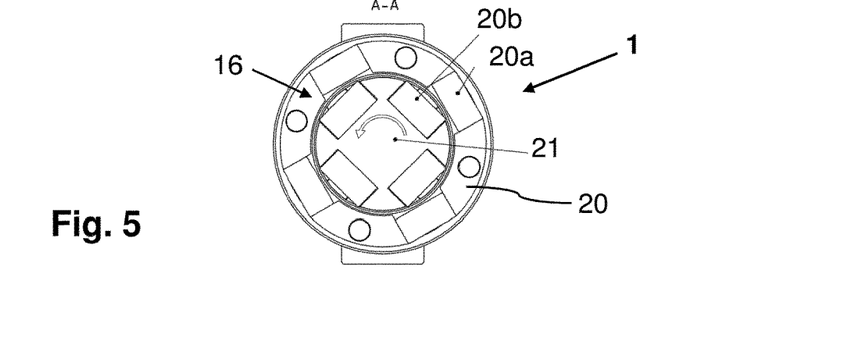
FIG. 5 a cross-section view of the tool-changing device along the line marked A-A in FIG. 4.

In particular, FIGS. 3 and 4 show how the counter element 8 comprises a carrier plate 11 at the end facing the tool head 23 in the position of use. The tool head 23 is attached to the counter element 8 through this carrier plate 11 in the position of use. The carrier plate 11 allows for a torque to be transferred from the locking element 7 to the counter element 8, and, finally, to the tool head 23 and the tool holders 2 attached to it. The carrier plate 11 serves as a convenient attachment connecting the tool head 23 to the counter element 8. Through its connection to the counter element 8—which is attached so that it can rotate—the tool head 23 on the tool-changing device 1 can be rotated relative to the frame 5 of the machine tool 18, as well as relative to the base body 5a of the tool-changing device 1.

The locking element 7 is arranged onto the base body 5a. The counter element 8 is attached to the side through the movable tool head 23. The base body 5a has a bracket 5b that can be seen across the figures. This bracket 5b is used to attach a glass scale (not shown), through which the movement of the base body 5a relative to the frame 5 of the machine tool 18 can be monitored.

To fasten the base body 5a to a corresponding part of the machine tool 18, a circumferential flange 5c can be used.

The counter element 8 is a counter claw element 12 onto which one of the claw profiles 10 mentioned above is attached. The locking element 7 is designed as a claw element 13 which is axially fixed relative to the axis of rotation R and relative to the counter element 8, which in turn features the other claw profile 10 mentioned above, and is also rotationally fixed relative to the base body 5a. The locking element 7 is designed as a claw element 13 and is similar in its function to an axially fixed claw jaw, in that it is not axially displaced relative to the axis of rotation R during the tool-changing process. The counter element 12, meanwhile, is designed as a counter claw element 8 and is similar to an axially displaced claw sleeve. In the example given here, the counter element 8 is moved relative to the locking element 7, which is stationary, at least during the changing process.

The locking element 7 and the counter element 8 have matching engaging surfaces 14 on the claw edges 15 of their claw profiles 10. The engaging surfaces 14 and the claw edges 15 are aligned with the axis of rotation R. The engaging surfaces 14 and claw edges 15 are aligned at an angle to the axis of rotation R. Through the angled positions of the engaging surfaces 14, a drive force from the counter element 8 can be deflected and the axial adjusting movement 22 of the counter element 8 can be transferred into a rotational positioning movement 21 by the counter element 8. Similarly, through their angled positions, the engaging surfaces 14 and the claw edges 15 determine the positioning movement's direction of rotation.

Both the locking element 7 and the counter element 8 have a total of four claw projections 15a and, relative to one another, the claw edges 15 are offset by 90 degrees around the counter element's axis of rotation R. This enables the locking element 7 to move the counter element 8 into four different positions and for these positions to be secured. The design of the claw projections 15a and claw edges 15 corresponds to the design of the tool holders 2. Additionally, the number of claw edges 15 provided at an angle on the locking element 7 corresponds to the number of angled claw edges 15 provided on the counter element 8, as well as to the number of tool holders 2.

The tool-changing device 1 also features a positioning device 16. This positioning device 16 is used to move the counter element 8 when it is released from the locking element 7. Such a movement achieves the aim of enabling the locking element 7 to engage with the counter element 8 in order to position subsequent tool holders 2 into the working position 6 and, finally, to secure the counter element 8 and the positioned tool holder 2 in place.

To this end, the positioning device 16 is designed to generate a positioning force that can be transferred through the counter element 8 to the tool head 23 and the tool holders 2. The positioning force is used to move each of the four tool holders 2 automatically and, in particular, to move the counter element 8 from the working position 6 to an intermediate position, as the counter element 8 moves from the locking position 9. In this intermediate position, the counter element 8 is arranged in an engaging position 17 relative to the locking element 7.

Figure 8A:
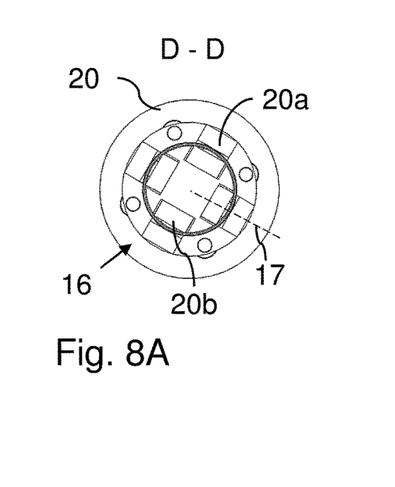
FIGS. 8A and 8B a cross-section and side view of the tool-changing device shown in the previous figures, where the counter element has reached the engaging position through movements generated by the adjusting device, and where the counter element is positioned relative to the locking element in such a way that the locking element can once again engage with the claw profile on the counter element to ensure the subsequent positioning of the tool holders.
Figure 8B:
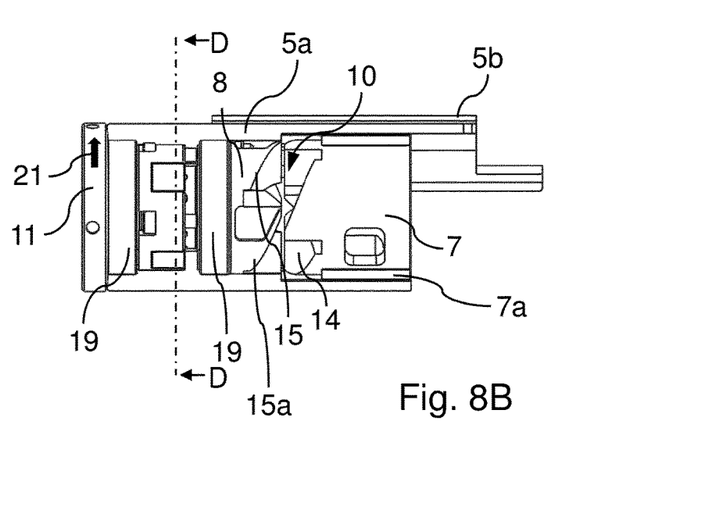

The engaging position 17 is shown through the dotted line in FIG. 8A. In the engaging position 17, the counter element 8 can engage once more with the locking element 7 through a process of axial adjustment, as shown in FIGS. 9A and 9B. This allows for the next of the tool holders 2 to be moved into the working position 6 (see FIGS. 6A and 6B, as well as FIGS. 10A and 10B).

The level of positioning force required by the positioning device 16 depends on the relative position of the counter element 8 to the locking element 7. This means that the positioning force takes on a maximum value in the relative position of the counter element 8 to the locking 7 that corresponds to the working position 6, i.e. when the counter element 8 is fixed into position by the locking element 7 (FIGS. 6A and 6B, as well as FIGS. 10A and 10B). In this way, the design can ensure that the positioning force—which acts in the direction of the positioning movement by the tool holders 2, as shown through arrow 21, that moves successive tool holders 2 into place, as well as, finally, the counter element 8—is sufficient to move the counter element 8 and the tool holders 2 into the engaging position 17 after they have been released from the locking element 7.

The positioning force described above moves through the successive relative positions of the counter element 8 to the locking element 7, alternates its movement between the direction of the positioning movement 21 of the tool holders 2 and the opposite direction, and also takes on a value of zero in the engaging position 17. This means that when the counter element 8 is released by the locking element, the counter element 8 takes on a secure intermediate position, thanks to the positioning force provided by the positioning device 16. FIG. 8A shows the counter element 8 and the positioning device 16 in such an intermediate position, between two success relative positions. This intermediate position corresponds to the engaging position 17, as described above.

In the engaging position 17, the positioning device 16 applies a holding force to hold the counter element 8 in the engaging position 17 for subsequent engagement of the locking element 7. Regardless of the direction in which the counter element 8 moves from the engaging position 17, the positioning device 16 automatically applies a positioning force both in the direction of the engaging position 17 and in the opposite direction.

The positioning device 16 is formed between the base body 5a of the tool-changing device 1 and the counter element 8, which rotates relative to this position. The positioning device 16 is a magnetic positioning device and features a retaining ring 20 with four magnets 20a that are distributed evenly around the counter element's 8 axis of rotation R. Through two bearings 19, the counter 8 is mounted onto the base body 5a of the tool-changing device 1 in such a way that it can be rotated. The base body 5a of the tool-changing device 1 can therefore also be referred to as a housing structure for these elements.

The retaining ring 20 featuring the magnets 20a holds the counter element 8 in the position of use on the outside of the device and is attached to the base body 5a of the tool-changing device 1. On the counter element 8, four counter magnets 20b are arranged at even intervals around the counter element's 8 axis of rotation R, are assigned to their respective magnets 20a on the retaining ring 20, and, as such, also form part of the magnetic positioning device 16. The magnets 20a and counter magnets 20b are arranged according to their polarity in such a way that they attract one another when in the engaging position 17 between the counter element 8 and the locking element 7, as shown in FIG. 8A, therefore ensuring the stability of the counter element 8 when in this engaging position 17. In the engaging position 17, the magnets 20a and the counter magnets 20b form a radial holding force through their mutual attraction and polarity.

When the magnets 20a and counter magnets 20b are displaced from the position shown in FIG. 8 by rotating the counter element 8 relative to the fixed retaining ring 20, the magnets 20a and counter magnets 20b produce the positioning force in the direction of the engaging position 17. This positioning force has at least one tangential component and must be mitigated by the counter element 8 before the counter element 8 can be positioning into the locking element 7.

The positioning force produced by the magnets 20a and counter magnets 20b is less than the force applied by the counter element 8, which results in a positioning force through the claw edges 15 on the claw-based locking element 7 and the claw-based counter element 8. As such, the positioning force produced by the positioning device 16 can be overcome through the counter element 8, and the counter element 8 can in turn be rotated further to move the next tool holder 2 in the series into the working position 6. The counter element 8 can therefore be described as a rotary slide, through which an axial movement by the counter element 8 can be transferred into a rotary positioning movement 21 by the counter element 8.

A magnet 20a and a counter magnet 20b are attached to each of the four tool holders 2 on the tool head 23, so that the positioning device 16 has a total of four magnets 20a and four counter magnets 20b, each separated by 90 degrees around the counter element's 8 axis of rotations R.

The drive device 4 comprises a drive for axial adjustment of the locking element 7. This drive is part of the drive device 4 on the machine tool 18 and is an electromagnetic drive device 4 that allows for lifting movements at high frequencies.

As such, the machine tool 18 features a drive device 4, which is designed to generate a tool feeder and the adjusting movement between the locking movement 4 between the locking element 7 and the counter element 8. This in turn means that a separate drive device to provide the adjusting movement during tool changes is not necessary.

The machine tool 18 is additionally made up of a locking device 24 with a locking tappet 25. Through the locking device 24 and the locking tappet 25, the locking element 7 of the tool-changing device 1 can be attached relative to the frame 5 of the machine 18 during the tool changing process. To this end, the locking tappet 25 is inserted into a corresponding recess 26 on the locking element 7. In this position, shown for example in FIG. 13, the locking tappet 25 holds the locking element 7 in place and ensures that the counter element 8 is released from the locking element 7 when the machine tool's 18 drive device 4 moves in the direction needed for the tool changing process as described above.

To prevent unintended release of the counter element 8 from the locking element 7 during high-frequency, oscillating feeder movement from the drive device 4, a compression spring 27 is included which secures the locking element 7 in its locking position on the counter element 8.

Figure 11:
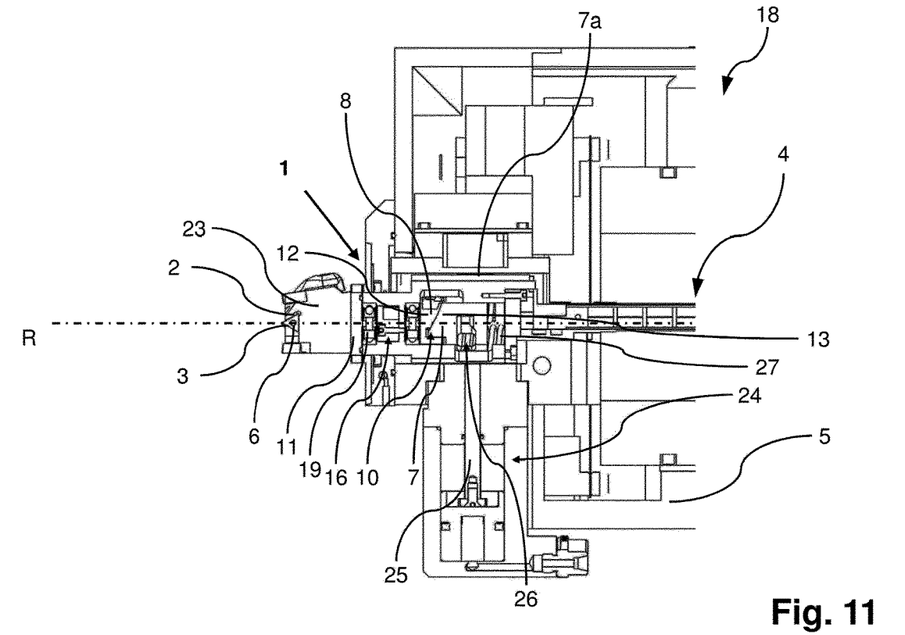
FIGS. 11 to 16 side views of the invention for a machine tool that features the invention for a tool-changing device, showing a tool-changing process that uses a driving device on the machine tool.

FIG. 11 shows the machine tool 18 in operation. During operation, the locking tappet 25 is disengaged and the locking element 7 can move freely with the motion provided by the machine tool's 18 drive device 4. Further, during operation, the drive device 4 serves as the feeder drive for the tool head 23, with the tools attached onto it 3.

Figure 12:
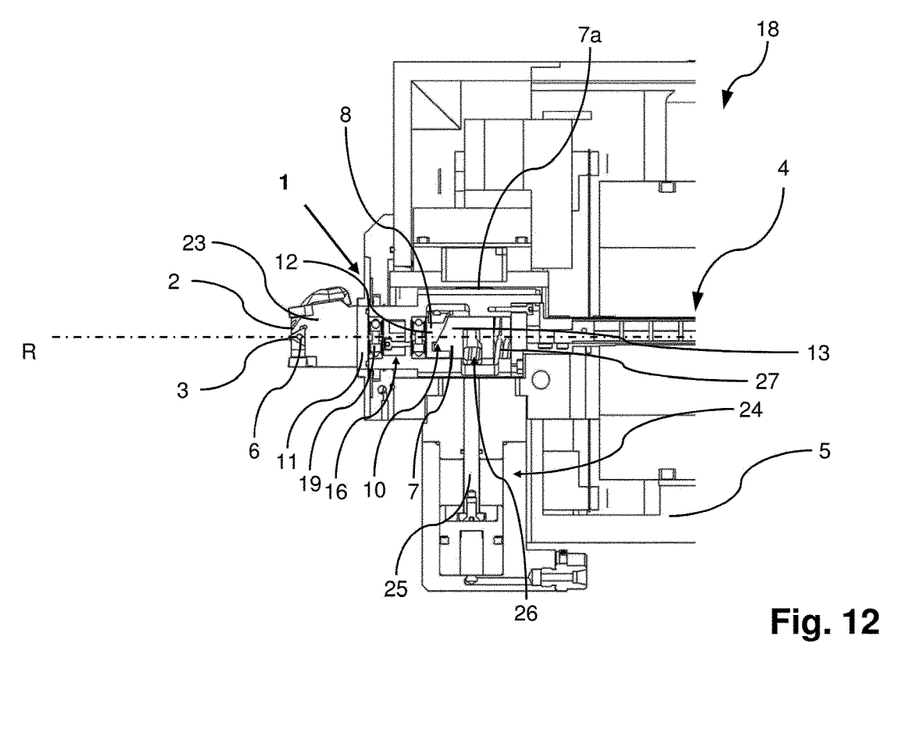

In FIG. 12, the tool head 23 is retracted compared to its position in FIG. 11. Here, the locking element 7 is position relative to the locking device 25 in such a way that the locking tappet 25 can be inserted into the recess 26 on the locking element 7. To this end, the locking tappet 25 can be operated pneumatically and/or hydraulically for this purpose.

Figure 13:
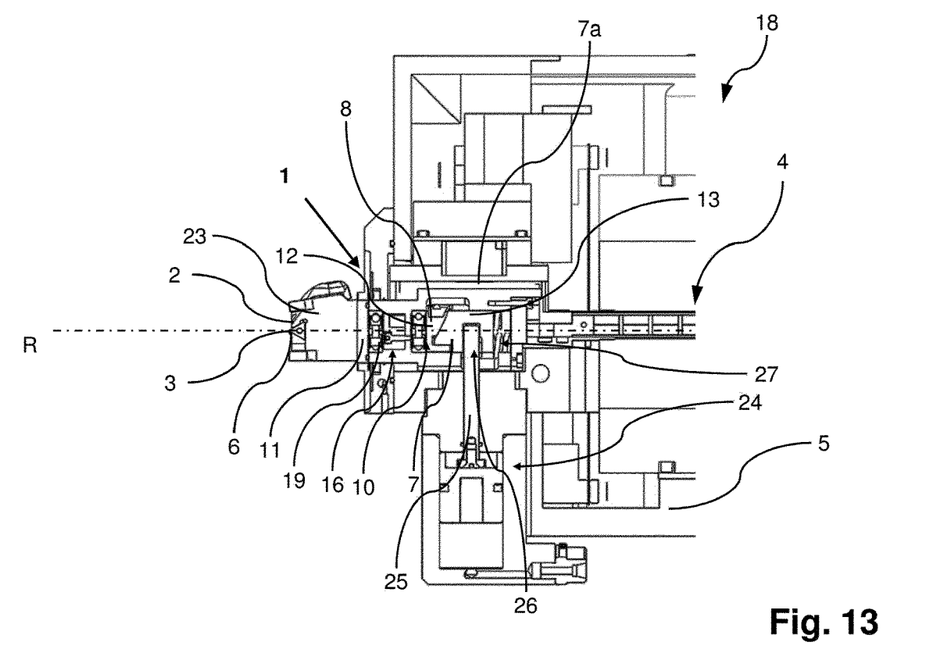

In FIG. 13, the locking tappet 25 has been inserted into the recess 26. This secures the locking element 7 relative to the locking tappet 25 and the frame 5 of the machine tool 18. Here, the machine tool 18 is in tool-changing mode. The drive device 4 on the machine tool 18 can now serve as the tool-changing drive.

Figure 14:
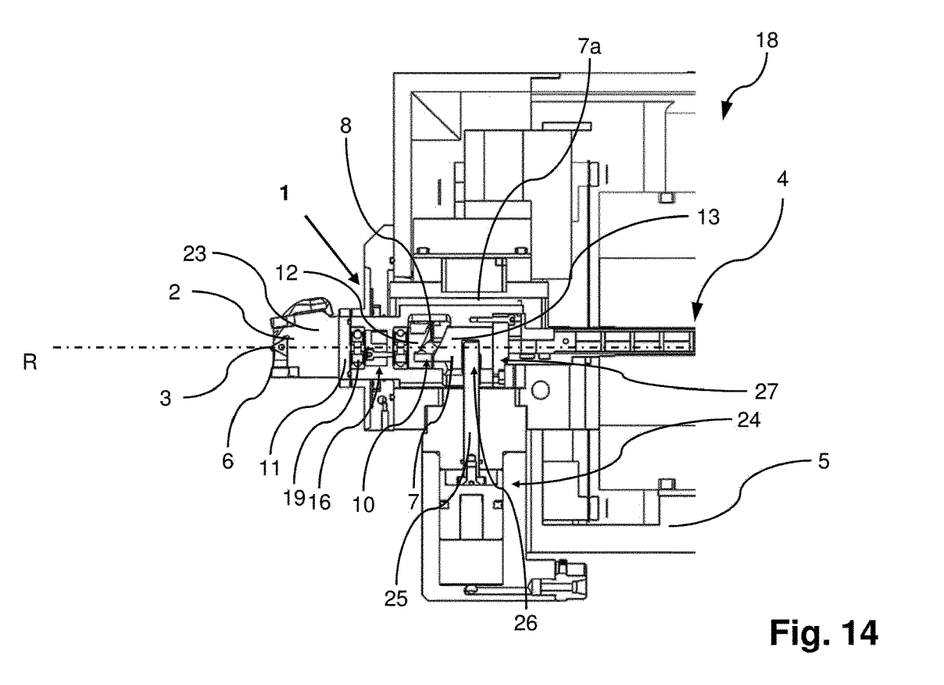

In FIG. 14, the tool head 23 moves forward through motion produced by the drive device 4. As the locking element 7 has been secured by the locking tappet 25, the counter element 8 and the locking element 7 are released from other another through the linear adjusting movement 22 caused by the drive device. Once the counter element 8 is completely released from the locking element 7, the positioning device 16 can turn the counter element 8 relative to the locking element 7 into the engaging position 17 and can prompt a change of tool.

Figure 15:
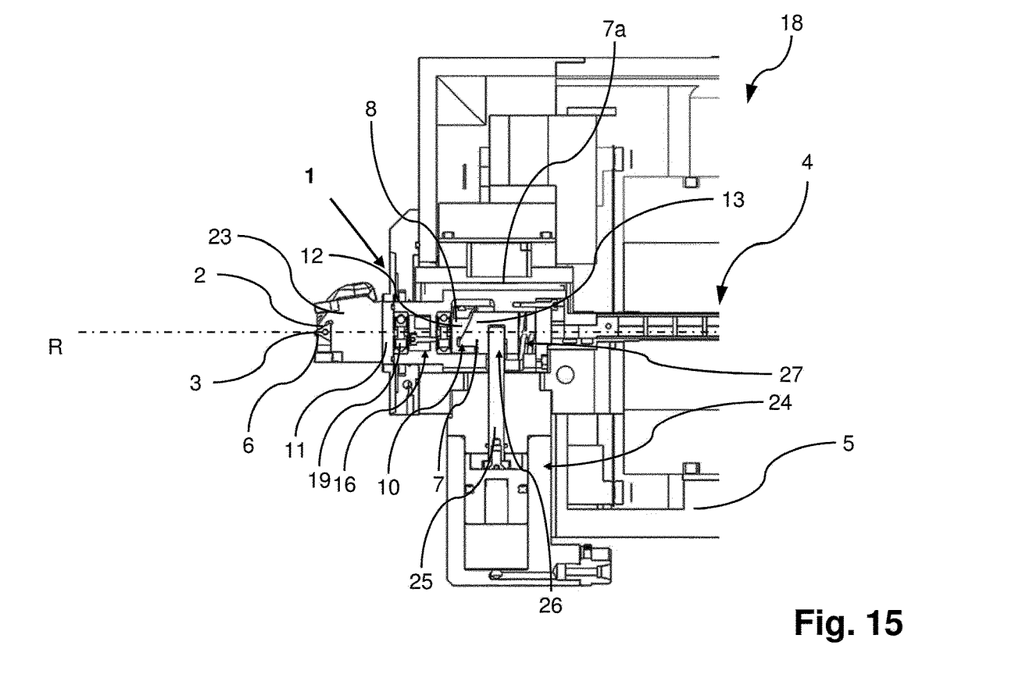

In FIG. 15, the tool head 23 with the counter element 8 has been moved back into its earlier position by the drive device 4. Through the engaging surfaces 14 on the claw edges 15, the tool head's 23 linear reset movement has converted the positioning movement 21 and the tool 3 has been changed.

Figure 16:
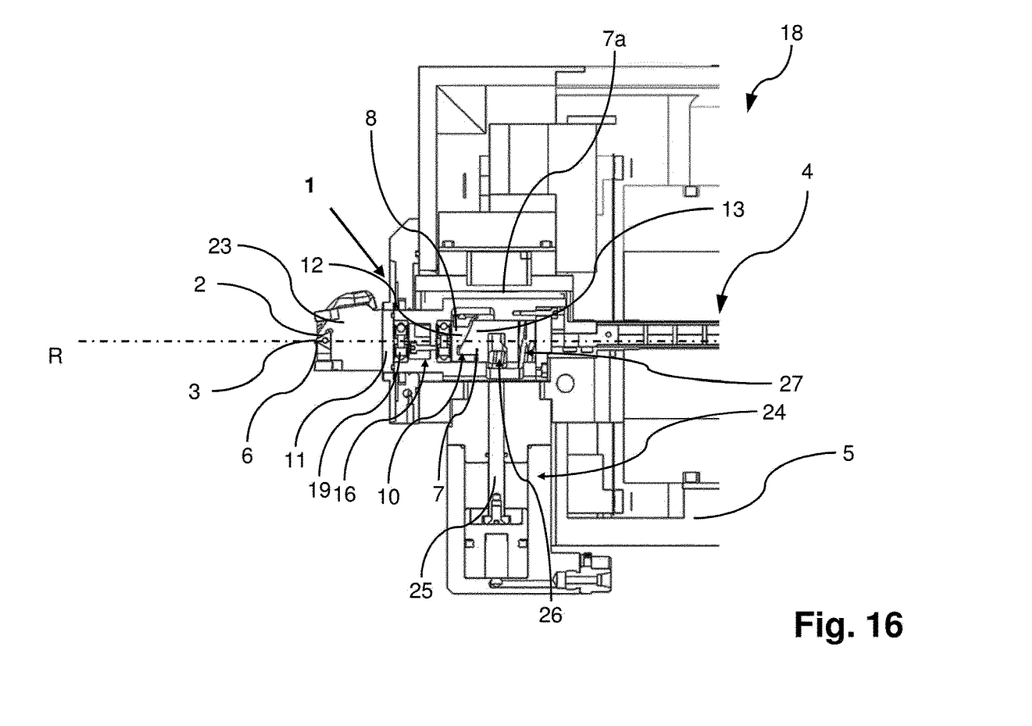

In FIG. 16, the locking tappet 25 has been withdrawn from the recess 26 of the locking element 7. The locking element 7 is in turn pushed back against the counter element 8 by the compression spring 27. The counter element 8 is secured in place by the locking element 7. The tool change is complete. The machine tool 18 is once again in operation and the machine tool's 18 drive device 4 can be used to general a feeder movement.

The tool-changing device 1 described above can be used to carry out the process for changing tools 3 on a machine tool 18 as described below.

In this process, a tool holder 2 carrying the tool 3 on the tool-changing device 1 reaches a working position 6, by bringing the counter element 8 on the tool-changing device 1 into a locking position 9 on the locking element 7. To position the tool holder 2, the counter element 8 engages with the locking element 7 and moves relative to it.

As already described above, the tool holders 2 and counter element 8 are connected to one another in a rotationally fixed way. Generally, the tool holders 2 and the counter element 8 must be connected to one another in such a way that a relative movement between them is impossible. Once the counter element 8 reaches its locking position 9 on the locking element 7, the tool holder reaches the working position 6 and is fixed into this position by the locking element 7. Once the counter element 8 is released from its locking position 9 (FIGS. 6A and 6B, 10 and 10B, as well as FIG. 14), the tool holder is moves automatically away from the working position 6 and the counter element 8 moves to an engaging position 17. This is achieved using the positioning device described above. During the positioning process, the tool holders 2 move along a closed, circulating path. As such, it is necessary for a full rotation of the path to be completed before a tool holder 2 returns to the same working position 6.

The invention relates to improvements in the area of so-called tool-changing devices 1, which are used on machine tools 18. Here, provision is made to carry out positioning of a tool holder 2 in the working position 6 of the tool holder with the aid of the locking element 7 of the drive device 4 of the tool-changing device 1. An adjusting movement 22 of the locking element 7 into the locking position 9 of the locking element on the tool holder 2 that is required for the use of the tool 3 is used to position the tool holder 2 in the working position 6 thereof, by the adjusting movement 2 of the locking element 7 being converted into a positioning movement 21 of the tool holders 2 (cf. FIG. 3).

LIST OF KEY TERMS

1 Tool-changing device
2 Tool holder
3 Tool
4 Drive device
5 Frame
5a Base body of 1
5b Bracket
5c Flange
6 Working position
7 Locking element
7a Guiding element of 1
8 Counter element
9 Locking position
10 Claw profile
11 Carrier plate
12 Counter claw element
13 Claw element
14 Engaging surfaces
15 Claw edges
15a Claw projections on 7 and 8

16 Positioning device
17 Engaging position
18 Machine tool
19 Bearing
20 Retaining ring
20a Magnet
20b Counter magnet
21 Positioning movement
22 Adjusting movement
23 Tool head
24 Locking device
25 Locking tappet
26 Recess
27 Compression spring
R Rotation axis of 8

The invention claimed is:

1. A tool-changing device (1), comprising
at least two tool holders (2) for holding one tool (3) each,
a drive device (4) through which
   the tool holders (2) are movable relative to at least one of a frame (5) or a base body (5a) of the tool-changing device (1) into a working position (6),
the drive device (4) includes at least one locking element (7) and at least one counter element (8), which is connected at least indirectly to the at least two tool holders (2), and
the at least two tool holders (2) are movable into different positions through a relative adjusting movement (22) between the locking element (7) and the counter-element (8) into the working position (6) in which the tool holders (2) are lockable, and
the adjusting movement (22) is carried out by engagement of the locking element (7) and the counter element (8) with one another, and
the adjusting movement (22) positions the tool holders (2) into the working position (6),
such that the respective tool holder (2) is positionable into the working position (6) in a positioning movement (21) when the locking element (7) and the counter element (8) are locked together.

2. The tool-changing device (1) as claimed in claim 1, wherein the locking element (7) and the counter element (8) interact to produce the relative adjusting movement (22) by a movement of the locking element (7) into a locking position (9) executed relative to the counter element (8), or by a movement of the counter element (8) into a locking position (9) on the locking element (7) executed relative to the locking element (7), such that the respective movement is converted into a positioning movement (21) of the counter element (8), and wherein the tool holders (2) are brought into the working position (6) by the positioning movement (21).

3. The tool-changing device (1) as claimed in claim 2, wherein the positioning movement of the counter element (8) is a linear movement or a rotary movement around an axis of rotation of the tool head (23), with the tool holders (2) rotating along a closed path around the axis of rotation (R).

4. The tool-changing device (1) as claimed in claim 1, wherein the counter element (8) has at least one of a tooth profile or claw profile (1) that corresponds to the locking element (7).

5. The tool-changing device (1) as claimed in claim 1, wherein the tool holders (2) are connected to the counter element (8) such that a relative movement between the tool holders (2) and the counter element (8) is prevented.

6. The tool-changing device (1) as claimed in claim 1, further comprising a tool head (23) on which the at least two tool holders (2) are attached, and the tool head is movable relative to at least one of the frame (5) or the base body (5a).

7. The tool-changing device (1) as claimed in claim 6, wherein the locking element (7) is attached to at least one of the frame (5) or the base body (5a) and the counter element (8) is attached on the movable tool head (23), or the locking element (7) is attached one the movable tool head (23) and the counter element (8) is attached to the frame (5).

8. The tool-changing device (1) as claimed in claim 1, wherein the locking element (7) is axially fixed as a claw element (13) relative to the counter element (8) and the counter element (8) is a rotatable counter claw element (12) which is axially moveable at least one of relative to an axis of rotation (R) thereof or relative to the counter element (8), and both the claw element and the counter claw element have at least one claw edge (15) which is angled relative to the axis of rotation (R) of the counter element (8) and the claw edges (15) correspond to one another, so that the adjusting movement (22) is transferrable through the claw edges (15) into a rotary positioning movement (21) by the counter element (8).

9. The tool-changing device (1) as claimed in claim 1, further comprising a positioning device (16) by which a positioning force is transferrable, at least indirectly, to the tool holders (2), and the locked counter element (8) in an unlocked state together with the tool holders (2) are automatically positionable or moved further away from the working position (6) into an engaging position (17) by the positioning force, and where the locking element (7) is again engagable with the counter element (8) or vice versa.

10. The tool-changing device (1) as claimed in claim 9, wherein a level of the positioning force required depends on the relative position of the locking element (7) and the counter element (8) relative to one another, and the positioning force reaches a maximum level when the locking element (7) is in the locking position.

11. The tool-changing device (1) as claimed in claim 10, wherein the positioning force reaches a minimum level when the counter element (8) is in an engaging position (17) and otherwise acts in or against a direction of a positioning movement (21) by the tool holders (2).

12. The tool-changing device (1) as claimed in claim 11, wherein the positioning device (16) is at least one of positioned between the frame (5) or the base body (5a) of the tool-changing device (1) and the counter element (8), or a magnetic positioning device (16).

13. The tool-changing device (1) as claimed in claim 1, wherein the drive is at least one of an electric, electromagnetic, pneumatic, or and/or hydraulic drive used to generate a tool feed.

14. A machine tool (18) comprising the tool-changing device (1) as claimed in claim 1.

15. The machine tool (18) as claimed in claim 14, wherein the machine tool (18) includes the drive device (4) which is adapted to generate a tool feed that is synchronised with workpiece rotation and the adjusting movement (22) between the locking element (7) and the counter element (8), and the machine tool (18) further comprises a locking device (24) by which the locking element (7) of the tool-changing device (1) is attachable relative to a frame (5) of the machine tool (18), at least for periods in which tools are changed.

16. A method for changing a tool (3) using a tool-changing device (1) according to claim 1, comprising bringing the tool holder (2) on the tool-changing device (1) which holds the tool (3) into a working position (6) through the relative adjusting movement (22) between the locking element (7) and the counter element (8).

17. The method as claimed in claim 16, further comprising moving the locking element (7) used to position the tool holder (2) into a locking position (9) in order to secure the counter element (8), or moving the counter element (8) used to position the tool holder (2) into a locking position (9), wherein the adjusting movement (22) is converted into a positioning movement (21) by the counter element (8), with the tool holder (2) fixed into the working position (6) while at least one of the locking element (7) or the counter element (8) reaches the locking position (9).

18. The method as claimed in claim 17, wherein the tool holder (2) moves from the working position (6) into an intermediate position or an engaging position (17) after releasing the locking element (7) or the counter element (8) from the locking position (9).

19. The method as claimed in claim 18, further comprising moving the tool holder (2) from the working position (6) into an intermediate position or an engaging position (17) using a positioning device (16).

20. The method as claimed in claim 19, further comprising operating a tool feed at least one before or after changing the tool using the drive device, with the tool feed being at least one of parallel to the adjusting movement or synchronised with workpiece rotation, as part of a chip machining process.

\* \* \* \* \*